United States Patent [19]

Visser et al.

[11] Patent Number: 5,654,052

[45] Date of Patent: Aug. 5, 1997

[54] INCORPORATION OF HIGH MOLECULAR WEIGHT NON-REACTIVE PDMS OILS IN FUSER MEMBERS

[75] Inventors: Susan Ann Visser; Richard John Kosakowski, Jr., both of Rochester; William Bernard Vreeland, Webster, all of N.Y.

[73] Assignee: Eastman Kodak Company, Rochester, N.Y.

[21] Appl. No.: 487,315

[22] Filed: Jun. 7, 1995

[51] Int. Cl.⁶ ..................................... B32B 25/20
[52] U.S. Cl. .............. 428/35.8; 428/36.8; 428/36.9; 428/323; 428/329; 428/447; 428/450; 492/53; 492/56; 524/261; 524/731; 524/860
[58] Field of Search ................... 428/447, 450, 428/323, 329, 35.8, 36.8, 36.9; 492/53, 56, 59; 524/261, 731, 860

[56] References Cited

U.S. PATENT DOCUMENTS

| | | | |
|---|---|---|---|
| 3,731,358 | 5/1973 | Artl | 29/132 |
| 4,074,001 | 2/1978 | Imai et al. | 428/329 |
| 4,085,702 | 4/1978 | Consaul et al. | |
| 4,777,087 | 10/1988 | Heeks et al. | 428/321.1 |
| 4,892,907 | 1/1990 | Lampe et al. | 524/731 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitgerald | 428/35.8 |
| 5,336,539 | 8/1994 | Fitzgerald | 428/36.8 |
| 5,474,821 | 12/1995 | Kass | 428/35.8 |
| 5,480,724 | 1/1996 | Fitzgerald et al. | 428/447 |

FOREIGN PATENT DOCUMENTS 0 417 814  3/1991  European Pat. Off. .

OTHER PUBLICATIONS

*Encyclopedia of Polymer Science and Engineering*, vol. 15, pp. 258–262, (John Wiley & Sons, Inc., 1989).
*An Introduction to the Chemistry of the Silicones*, 2nd Ed., pp. 82–83, Eugene G. Rochow (John Wiley & Sons, Inc., 1951).

*Primary Examiner*—Patrick Ryan
*Assistant Examiner*—Marie R. Yamnitzky
*Attorney, Agent, or Firm*—Anne B. Kiernan

[57] ABSTRACT

A fuser member having as its outermost layer, a composite material comprising:
  a) a crosslinked, oxide filled, poly(dimethylsiloxane) which contains
  b) a non-crosslinked, non-reactive poly (dimethylsiloxane) oil having a viscosity of at least 25,000 CPS.

7 Claims, No Drawings

INCORPORATION OF HIGH MOLECULAR WEIGHT NON-REACTIVE PDMS OILS IN FUSER MEMBERS

FIELD OF THE INVENTION

The present invention relates to the field of fuser members useful in electrophotographic copying.

BACKGROUND OF THE INVENTION

A widely used method for affixing toner materials to a receiver sheet is by the application of high temperature and pressure in the fusing subsystem of a photocopying machine. A common configuration for a fusing subsystem is to place a pair of cylindrical rollers in contact. The roller that will contact the side of the receiver sheet carrying the unfixed or unfused toner is known as the fuser roller. The other roller is known as the pressure roller. The area of contact is known as the nip.

The toner receiver sheet containing the unfixed or unfused toner is passed through the nip. A soft coating on one or both of the rollers allows the nip to increase in size relative to the nip which would have been formed between two hard rollers and allows the nip to conform to the receiver sheet, improving the fusing quality. Typically, one or both of the rollers are heated, either through application of heat from the interior of the roller or through external heating. A load is applied to one or both rollers in order to generate the higher pressures that are necessary for good fixing or fusing of the toner to the receiver sheet.

The application of high temperature and pressure as the receiver sheet passes through the nip causes the toner material to flow to some degree, increasing its contact area with the receiver sheet. If the cohesive strength of the toner and the adhesion of the toner to the receiver sheet is greater than the adhesion strength of the toner to the fuser roller, complete fusing occurs. However, in certain cases, the cohesive strength of the toner or the adhesion strength of the toner to the receiver is less than that of the toner to the fuser roller. When this occurs, some toner will remain on the roller surface after the receiver sheet has passed through the nip, giving rise to a phenomenon known as offset. Offset can also occur on the pressure roller.

Offset is undesirable because it can result in transfer of the toner to non-image areas of succeeding copies and can lead to more rapid contamination of all machine parts in contact with the fusing rollers and to increased machine maintenance requirements. It can also lead to receiver (paper) jams as the toner-roller adhesion causes the receiver sheet to follow the surface of the roller rather than being released to the post-nip paper path.

It is common in some machines to apply release oil externally to the roller in the machine as it is being used. External application of a release agent carries certain disadvantages. The release agent can be spread to other parts of the machine, causing contamination. Further, streaks may appear in the image as a result of imperfect spreading of the release agent across the roller surface. Therefore, it is desirable to improve the release performance of the roller materials in order to be able to minimize the amount of release agent that must be applied to the roller.

Use of a soft fuser roller and a harder pressure roller have been shown to facilitate release of the toned receiver from the fuser roller. Low surface energy materials such as fluorine-containing coatings or silicone rubbers have been used as fuser roller coatings. An example of a low surface energy material is described in U.S. Pat. No. 3,731,358 which discloses the use of a poly(dimethylsiloxane) (hereinafter sometimes referred to as "PDMS") as a coating for a fuser roller. This patent also discloses coating the roller with silicone oil after it has been used for a period of time in order to restore release properties.

In European Patent Application 0 417 814 A, there is disclosed a fuser roller having a PDMS outer layer which has filler that contains absorbed silicone oil. It also discloses a fuser roller having a low viscosity PDMS oil incorporated therein in a comparative example. Poor offset performance was noted.

Addition of a low viscosity silicone oil into the roller material during formulation has also been suggested to improve the release properties of the roller in: K. Imai, N. Hasebe, T. Asmi, S. Soga, I. Fukushima, and Y. Asahina, U.S. Pat. No. 4,074,001, 2/78.

There continues to be a need for improved fuser and pressure rollers with improved fusing performance, e.g. improved paper release, toner-paper adhesion or reduced "crack width".

SUMMARY OF THE INVENTION

In accordance with the present invention there is provided a fuser member having as its outermost layer, a composite material comprising:

a) a crosslinked, oxide filled, poly(dimethylsiloxane) which contains b) a non-crosslinked, non-reactive poly(dimethylsiloxane) oil having a viscosity of at least about 25,000 CPS.

DETAILED DESCRIPTION OF THE INVENTION

The fuser member of the present invention can be either the fuser roller, as defined above, or the pressure roller also as defined above.

The outermost layer of the fuser member of the invention includes an oxide filled crosslinked PDMS. The filler is an oxide or mixture of oxides. Typical oxides include metal oxides such as aluminum oxide, iron oxide, tin oxide, zinc oxide, copper oxide and nickel oxide. Silica (silicon oxide) can also be used.

Examples of suitable materials for part "a)" of the outer layer are filled condensation-crosslinked PDMS elastomers disclosed in U.S. Pat. No. 5,269,740 (copper oxide filler), U.S. Pat. No. 5,292,606 (zinc oxide filler), U.S. Pat. No. 5,292,562 (chromium oxide filler), U.S. patent application Ser. No. 08/167,584, filed Dec. 14, 1993 (tin oxide filler), U.S. Pat. No. 5,336,539, (nickel oxide).

Silanol-terminated PDMS polymers and methods of their preparation are well known. They are readily commercially available, e.g., from Huls America, Inc.,(United Chemical) 80 Centennial Ave., Piscataway, N.J., U.S.A., and have the structure:

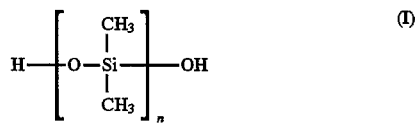

For purpose of the present invention n is an integer such that the Structure (I) polymer has a weight average molecular weight of from 7,000 to 70,000. If the molecular weight were below 7,000, the final crosslinked PDMS would have a high crosslink density that would make the material too hard and brittle, and not resilient enough to serve practically in a base cushion layer. If the molecular weight were above 70,000, the final crosslinked PDMS would be too unstable under conditions of high temperature and cyclic stress (i.e., there would be too much creep and change in hardness over time).

The PDMS polymers can be crosslinked with multifunctional silanes. The multifunctional silanes that can serve as crosslinking agents for the Structure (I) polymers are well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy ($CH_2$=C(R)O—), alkoxy (R—O—), dialkylamino ($R_2N$—), or alkyliminoxy ($R_2C$=N—O—) groups, wherein R represents an alkyl moiety. Some specific examples of suitable multifunctional silane crosslinking agents are methyltrimethoxysilane, tetraethoxysilane, methyltripropenoxysilane, methyltriacetoxysilane, methyltris(butanone oxime)silane, and methyltris(diethylamino)silane.

In the case where alkoxy functional groups are employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

The primary crosslinked PDMS material used for the Examples and Comparative Examples is Stycast® 4952, sold by Grace Specialty Polymers, Massachusetts. Stycast® 4952 is composed of a network-forming polymer that is a silanol-terminated (α,ω-hydroxy-) poly(dimethyl siloxane) (PDMS). The number of repeat units is such that the silanol-terminated PDMS (α,ω-dihydroxypolydimethyl siloxane) has a viscosity in the range of 500–5000 cPs. This composition includes the filler. The filler is believed to be 32–37 vol % aluminum oxide and 2–6 vol % iron oxide particulate fillers. Polyethyl silicate (condensed tetraethylorthosilicate) is present as the crosslinking agent.

Specific examples of useful catalysts for this polymer are dibutyltin diacetate, tin octoate, zinc octoate, dibutyltin dichloride, dibutyltin dibutoxide, ferric chloride, lead dioxide, or mixtures of catalysts such as CAT50® (sold by Grace Specialty Polymers, Massachusetts). CAT50® is believed to be a mixture of dibutyltin dibutoxide and dibutyltin dichloride diluted with butanol.

The second component "b)" of the outermost layer is a non-crosslinked, non-reactive PDMS oil. Unlike the PDMS polymers just described, these PDMS polymers will not crosslink in the presence of the crosslinking agent and catalyst. Useful PDMS polymers of this type include poly (dimethyl siloxane) which is terminated with trialkylsiloxy groups at the chain ends. This PDMS oil contains no reactive functional groups, unlike the polymeric release agents described in U.S. Pat. No. 4,257,699, and does not undergo chemical reactions with any of the other components (e.g., polymers, fillers, release agents) of the outermost layer or externally applied release agents.

In preferred embodiments, the component a) is present in about 100 parts by weight while the component b) is present in from about 0.5 to about 6 parts by weight.

The presence of non-reactive PDMS oils in concentrations greater than 6% result in materials whose wear resistance is too low to allow for long roller life. Addition of a non-reactive PDMS oil in amounts less than 0.5% is insufficient to give the fusing performance benefits described in this invention.

The various components can have the following weight percentages:
(a) 10–60 wt % α,ω-hydroxy- poly(dimethyl siloxane) with a viscosity of 500–5000 cPs;
(b) 55–85 wt % oxide fillers, especially the combination of 55–70 wt % aluminum oxide and 5–15 wt % iron oxide;
(c) 0.5–5 wt % crosslinking agent;
(d) 0.05–2 wt % catalyst;
(e) 0.5–6 wt % non-reactive PDMS oil (based on the combined weight of components a–d) of viscosity of 25,000–1,000,000 cPs (measured at 25° C.).

Non-reactive PDMS oil is incorporated into the Stycast® 4952 at 1–5 wt % (weight of oil to weight of Stycast® 4952) in the Examples of this invention.

Unlike previous art which suggests that only low viscosity non-reactive PDMS oils will improve the properties of fusing roller materials, higher viscosity non-reactive PDMS oils are incorporated into the formulations of this invention. Non-reactive PDMS oils of viscosity lower than about 25,000 cPs tend to diffuse out of the roller over the course of the roller's lifetime, resulting in a loss of the advantages accrued by incorporation of the oil into the formulation. Non-reactive PDMS oils of viscosity greater than 1,000,000 cPs would not be expected to give the fusing improvements of the lower viscosity oils because of the limitations on the degree of dispersion of the non-reactive PDMS oil in the crosslinked polymer network. The local concentration of non-reactive PDMS oil in a network is determined by the amount of oil incorporated and the molecular weight of the oil.

Oil viscosity and molecular weight are directly related so that a higher molecular weight corresponds to a higher viscosity oil. For equal weights of oil incorporated, the higher molecular weight oil will produce a network having regions of higher local oil concentration because of the connectivity of the siloxane groups in the polymer chain. Conservation of mass then requires that there be a smaller number of these higher concentration regions, resulting in a lower degree of homogeneity of dispersion of the oil in the network. In contrast, a lower molecular weight oil will have a greater number of regions containing PDMS oil, although each of these regions will be of lower PDMS concentration than those found in the higher molecular weight oil case. The greater number of regions means that there is a more homogenous dispersion of the PDMS oil in the network, allowing the advantageous fusing properties to be attained by the roller material.

To form the layer of a fuser member in accordance with the invention, the Structure (I) polymer, a slight excess of the stoichiometric amount of multifunctional silane to form crosslinks with all the hydroxy end groups of the Structure (I) polymer, and the appropriate amount of filler are thoroughly mixed on a three-roll mill. If a catalyst is necessary, it is then added to the mix with thorough stirring. The non-reactive PDMS polymer can be added at any stage. The mix is then degassed and injected into a mold surrounding the fuser member, e.g. roll, core to mold the material onto the core. The covered core remains in the mold for a time sufficient for some crosslinking to occur (e.g., 18 hours). The covered roll is then removed from the mold and heated to accelerate the remaining crosslinking.

It is currently preferred to apply the layer of the invention over a support which has been conversion coated and primed with metal alkoxide primer in accordance with a U.S. patent application filed by Allen Kass, Oct. 21, 1993, entitled "FUSING MEMBER FOR ELECTROSTATOGRAPHIC REPRODUCING APPARATUS AND METHOD FOR PREPARING FUSING MEMBER", now U.S. Pat. No. 5,474,821, issued Dec. 12, 1995.

If the material of this invention is coated over another coating layer, one or more methods of layer-to-layer adhesion improvement, such as corona discharge treatment of the other coating layer's surface, may be applied prior to application of the material of this invention. Various methods of layer-to-layer adhesion improvement are well known to one skilled in the art.

The material of this invention can be used as an outer coating layer over an oil barrier layer. An oil-barrier layer can be obtained by coating an underlying silicone elastomer, coated directly or indirectly on a cylindrical core, with a composition formed by compounding a mixture comprising a fluorocarbon copolymer, a fluorocarbon-curing agent, a curable polyfunctional poly($C_{1-6}$ alkyl)phenylsiloxane polymer, one or more fillers and an accelerator for promoting crosslinking between the curing agent and the fluorocarbon copolymer.

The roller core, usually cylindrical in shape, can be composed of any rigid metal, ceramic, or plastic substance. The material should have sufficient ductility to avoid breakage of the core during normal maintenance and operation of an electrophotographic machine. Metal cores are preferred if the roller is to be internally heated because of the high thermal conductivity of metal. Suitable core materials can include aluminum, stainless steel, metal alloys, ceramic materials, combinations of ceramic and polymeric materials, and polymeric materials such as thermoset resins with or without reinforcing additives.

The thicknesses of the outermost layer of the invention and any other layers present, e.g. cushion layers and the like, can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thicknesses in the range from 0.5 to 6.0 mm have been found to be appropriate for various applications.

Release oils can be used with the fuser members of the invention although it is not always necessary or desirable. When used, the oil is continuously coated over the surface of the fuser member in contact with the toner image. The fuser member of the invention can be used with polydimethylsiloxane or mercapto functionalized polydimethylsiloxane release oils at normally used application rates or at reduced application rates, from about 0.5 mg/copy to 10 mg/copy (the copy is 8.5 by 11 inch 20 pound bond paper).

The rolls produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

The materials discussed in the Examples and Comparative Examples were prepared by thoroughly mixing the Stycast® 4952 to ensure complete dispersion of the filler in the material, addition of the specified type and amount of oil to the Stycast® 4952 while continuing to mix the formulation, and finally addition and mixing in of the catalyst, CAT50®, in the ratio of 1 part by weight CAT50® to 260 to 400 parts by weight Stycast® 4952 plus oil depending on the specific example. The catalyzed material was degassed prior to application to the roller.

The rollers discussed in the Examples and Comparative Examples below were prepared by scrubbing clean the outer surface of the core, rinsing the core with hot water and drying it. The cores were sized to fit into the machine and roller position described in each Example or Comparative Example. To the core was applied a thin layer of primer, SS4004 obtained from General Electric Co., U.S.A. (the metal alkoxide primer described previously), using a brush and then allowing the primer to dry in ambient air (room temperature) for one hour. The material of this invention was applied to the roller core and allowed to cure to the touch (not tacky) in ambient air (room temperature). The roller was slowly heated to 170° C. over a 1 hour period, held at 170° C. for an additional 10 hrs., heated slowly to 218° C. over a 1 hour period, held at 218° C. for an additional 18 hours, and finally cooled to room temperature over 1 hr. to complete the crosslinking reaction.

After curing, the roller materials were ground, a standard procedure, to achieve the final dimensions required for the particular machine and roller type.

A method of determining the influence of one or more components of the fusing subsystem on the extent of the adhesion of the toner to the paper is known as the "crackwidth" measurement. In this test, a high density patch of toner is deposited on a sheet of paper, and the toner is fused onto the paper using the fusing system under evaluation. The paper is then creased in half through the middle of the high density area, folding toward the toned side of the paper. The paper is unfolded, and the width of the crack in the toned area introduced by the folding process is measured. The value is reported as the crackwidth. Smaller crackwidths indicate a higher degree of toner-paper adhesion and therefore a higher image quality. Fusing systems that give smaller crackwidths are more likely to avoid problems such as transference of the toner from the receiver to external sources such as plastic folders or envelopes.

The following examples are presented for a further understanding of the invention.

EXAMPLE 1

Stycast® 4952 was blended with 1 wt % Dow Corning 200 60,000 cPs non-reactive PDMS oil as described above. CAT50® catalyst was added at the rate of one part of catalyst to 260 parts by weight Stycast®. The mixture was degassed and applied to an IBM Series III electrophotographic machine aluminum fuser roller core which had been prepared as described above. The roller was allowed to cure to the touch and was further cured as described above. The roller material was ground to its final dimensions. The thickness of the layer was 1.2 mm.

The roller of this Example was used to replace the fuser roller in an IBM Series III electrophotographic machine. 100,000 copies were made on 16 pound paper using standard machine conditions which include no release agent (oil) application and use of a single-component toner. The number of jams occurring during the course of the 100,000 copy run were recorded, and the crackwidth of the 100,000th copy was measured. (After each jam, the paper path was cleared, and the copy run was resumed.) The results are reported in Table 1.

Comparative Example 1

An IBM Series III fuser roller was prepared as described in Example 1 except that the coating material was Stycast®

4952 without oil. Machine testing was performed as described in Example 1, and the results are reported in Table 1.

EXAMPLE 2

The material described in Example 1 was prepared and applied to an aluminum Ektaprint® 1575 pressure roller core that had been prepared as described above. The material was cured as in Example 1 and was ground to the final dimensions required for use as a pressure roller in an Ektaprint® 1575 machine. The layer had a thickness of 0.5 mm.

The roller of this example was used to replace the pressure roller in an Ektaprint® 1575 electrophotographic machine. 100,000 copies on 16 pound paper in duplex mode were made using standard machine conditions which include application to the fuser roller of 2 mg/copy PDMS oil as release agent, fusing at 177° C., and use of a dual-component toner. The number of jams occurring during the course of the 100,000 copy run were recorded, and the crackwidth of the 100,000th copy was measured. (After each jam, the paper path was cleared, and the copy run was resumed.) The results are reported in Table 1.

Comparative Example 2

An Ektaprint® 1575 pressure roller was prepared as described in Example 2 except that the coating material was Stycast® 4952 without oil. Machine testing was performed as described in Example 2, and the results are reported in Table 1.

EXAMPLE 3

Stycast® 4952 was blended with 1 wt % Dow Corning 200 60,000 cPs non-reactive PDMS oil as described above. CAT50® catalyst was added at the rate of one part of catalyst for 400 parts by weight of Stycast®. The mixture was degassed and applied to the a steel Ektaprint® 85 electrophotographic machine pressure roller core which had been prepared as described above. The roller was allowed to cure to the touch and was further cured as described above. The roller material was ground to its final dimensions. The thickness of the layer was 5.7 mm.

The roller of this Example was used to replace the pressure roller in Ektaprint® 85 electrophotographic machine. 25,000 copies were made on 16 pound paper using standard machine conditions. The number of jams occurring during the course of the 25,000 copy run were recorded, and the crackwidth of the 25,000th copy was measured. (After each jam, the paper path was cleared, and the copy run was resumed.) The results are reported in Table 1.

EXAMPLE 4

An Ektaprint® 85 pressure roller was prepared as described in Example 3 except that 5 wt % Dow Corning 200 60,000 cPs oil was used instead of 1 wt %. The roller was tested in an Ektaprint® 85 electrophotographic machine as described in Example 3, and the testing results are presented in Table 1.

EXAMPLE 5

An Ektaprint® 85 pressure roller was prepared as described in Example 3 except that catalog number PS047 30,000 cPs PDMS oil (United Chemicals, Inc.) was used in place of Dow Corning 200 60,000 cPs PDMS oil. The PS047 was added at 1 wt %. The roller was tested in an Ektaprint® 85 electrophotographic machine as described in Example 3, and the testing results are presented in Table 1.

EXAMPLE 6

An Ektaprint® 85 pressure roller was prepared as described in Example 3 except that PS049.5 1,000,000 cPs PDMS oil (United Chemicals, Inc.) was used in place of Dow Corning 200 60,000 cPs non-reactive PDMS oil. The PS049.5 was added at 1 wt %. The roller was tested in an Ektaprint® 85 electrophotographic machine as described in Example 3, and the testing results are presented in Table 1.

Comparative Example 3

An Ektaprint® 85 pressure roller was prepared as described in Example 3 except that the coating material was Stycast® 4952 without oil. Machine testing was performed as describe in Example 3, and the results are reported in Table 1.

TABLE 1

| Example | Roller Type | Oil Type | Oil Viscosity at 25° C. | Amount of oil (wt %) | Jams/-Number of Copies | Crack-width |
|---|---|---|---|---|---|---|
| Ex. 1 | IBM Series III Fuser Roller | Dow Corning 200 | 60,000 | 1 | 12/100,000 | 27 |
| Comp. Ex. 1 | IBM Series III Fuser Roller | None | — | 0 | 118/100,000 | 60 |
| Ex. 2 | Ektaprint 1575 Pressure Roller | Dow Corning 200 | 60,000 | 1 | 2/100,000 | 25 |
| Comp. Ex. 2 | Ektaprint 1575 Pressure Roller | None | — | 0 | 6/100,000 | 182 |
| Ex. 3 | EK85 Pressure Roller | Dow Corning 200 | 60,000 | 1 | 0/25,000 | 70 |
| Ex. 4 | EK85 Pressure Roller | Dow Corning 200 | 60,000 | 5 | 0/25,000 | 60 |
| Ex. 5 | EK85 Pressure Roller | PS047 | 30,000 | 1 | 0/25,000 | 67 |
| Ex. 6 | EK 85 Pressure Roller | PS049.5 | 1,000,000 | 1 | 3/25,000 | 81 |
| Comp. Ex. 3 | EK85 Pressure Roller | None | — | 0 | 4/25,000 | 138 |

Advantages

The Examples and Comparative Examples demonstrate that incorporation of a small amount of high viscosity non-reactive PDMS oil into a filled silicone rubber formulation decreases the jam frequency (improves release properties) and the crackwidth (improves the fusing quality) when the material is used as a fusing roller (Ex. 1 and Comp. Ex. 1) or a pressure roller (Ex. 2–6 and Comp. Ex. 2–3). Further, it is demonstrated that the improvements are obtained regardless of whether the fusing system includes application of an external release agent and regardless of whether a single-component or dual-component toner is used. Finally, incorporation of a small amount of high viscosity non-reactive PDMS oil directly into the silicone rubber formulation prior to coating on the roller offers an advantage over application of the PDMS oil after coating and curing by eliminating a step in the roller manufacturing process.

The invention has been described with particular reference to preferred embodiments thereof but it will be understood that variations and modifications can be effected within the spirit and scope of the invention.

We claim:

1. A fuser member having a support core and, as its outermost layer, a composite material comprising:

a) a crosslinked, oxide filled, poly(dimethylsiloxane), wherein said poly(dimethylsiloxane) has a weight-average molecular weight before crosslinking of about 7,000 to 70,000; and b) about 0.5 to 1 weight percent, based on the weight of component a), of a non-crosslinked, non-reactive poly(dimethylsiloxane) oil having a viscosity of about 25,000 cPs to 1,000,000 cPs, measured at 25° C.

2. The fuser member according to claim 1, wherein component a) comprises a (α-ω-hydroxy-) poly(dimethylsiloxane) having a viscosity before crosslinking in the range of 1000–3000 cPs, measured at 25° C.; a polyethylsilicate crosslinking agent; and an oxide filler containing particles of aluminum oxide and of iron oxide.

3. The fuser member according to claim 1 wherein component b) is poly(dimethyl siloxane) which is terminated with trialkylsiloxy groups at the chain ends.

4. The fuser member according to claim 1 comprising a fuser roller.

5. The fuser member according to claim 1 comprising a pressure roller.

6. The fuser member according to claim 1 further comprising an oil barrier layer formed on said support core beneath said outermost layer.

7. The fuser member according to claim 1 further comprising a cushion layer formed on said support core beneath said outermost layer.

* * * * *